T857,030

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 695

669,719

METHINE DYES FROM INDAN-1,3-DIONE

Gether Irick, Jr., and James M. Straley, both % Tennessee Eastman Company, Box 511, Kingsport, Tenn. 37662

Filed Sept. 22, 1967. Published Dec. 17, 1968

Class 260—240

No Drawing. 14 Pages Specification

Novel water insoluble methine compounds prepared by condensing an indan -1,3-dione with an indolinylidene-acetaldehyde, a formyldiphenylamine, a formyltetrahydroquinoline, or a cinnamaldehyde are useful as dyes for hydrophobic textile materials. These compounds have the formula below:

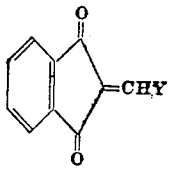

wherein:

R is H, lower alkyl, lower alkoxy, halo or nitro

Y is a group of the formula

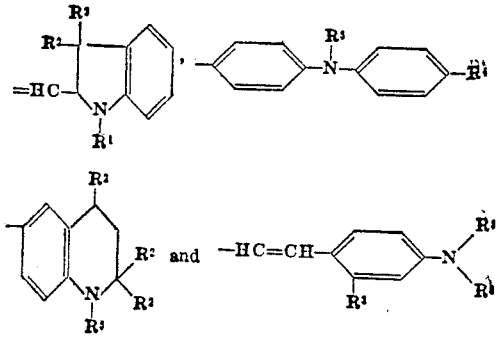

wherein $R^1$ is an alkyl or phenyl group, $R^2$ is lower alkyl, $R^3$ and $R^4$ are H, lower alkyl, lower alkoxy, halogen, lower alkylthio, lower dialkylamino, nitro or CN and $R^5$ and $R^6$ are lower alkyl.